United States Patent
Radik et al.

[11] Patent Number: 4,888,530
[45] Date of Patent: Dec. 19, 1989

[54] TWO-PHASE GATE MOTOR

[76] Inventors: Tynu A. Radik, ulitsa Karu, 13, kv.18; Anatol J. Sjugis, ulitsa Toome, 65; Toom A. Pungas, bulvar Sypruse, 219, kv. 3; Vilie K. Korsen, ulitsa Ranniku, 48b, kv. 10, all of Tallin, U.S.S.R.

[21] Appl. No.: 294,067
[22] PCT Filed: Mar. 24, 1987
[86] PCT. No: PCT/SU87/00035
§ 371 Date: Nov. 23, 1988
§ 102(e) Date: Nov. 23, 1988
[87] PCT. Pub. No: WO88/07783
PCT Pub. Date: Oct. 6, 1988
[51] Int. Cl.[4] .............................. H02K 29/08
[52] U.S. Cl. ........................ 318/254; 318/138
[58] Field of Search ................. 318/138, 254, 439

[56] References Cited
U.S. PATENT DOCUMENTS 3,767,986 10/1973 Wada .
3,891,904 6/1975 Pollmeier .
4,028,598 6/1977 Bergmans .
4,230,976 10/1980 Muller .
4,459,520 7/1984 Wada ............................ 318/254
4,460,856 7/1984 Mizumoto .................... 318/138 X
4,724,365 2/1988 Muller .......................... 318/138 X

FOREIGN PATENT DOCUMENTS 2802263 7/1978 Fed. Rep. of Germany ...... 318/138
2727534 1/1979 Fed. Rep. of Germany ...... 318/138

Primary Examiner—Bentsu Ro
Attorney, Agent, or Firm—Lilling & Greenspan

[57] ABSTRACT

A two-phase gate motor comprises a stator (1) with power windings (2, 3) having different phases, a rotor (6) made as a permanent magnet with poles (7) on the active surface, facing the power windings (2, 3), and magneto-sensitive rotor position pickups (4, 5) disposed very close to the power windings (2, 3) and having outputs thereof connected to inverting inputs (10, 11) and non-inverting inputs (12, 13) of the operational amplifiers (8, 9). Outputs (14, 15) of the operational amplifiers (8, 9) are electrically connected to means (20, 21) for compensation of electromagnetic interferences produced by the power windings (3, 2) of different phases in the magnetosensitive rotor position pickups (4, 5) connected, in turn, to inputs (10, 13) of operational amplifiers (8, 9) respectively.

4 Claims, 2 Drawing Sheets

TWO-PHASE GATE MOTOR

TECHNICAL FIELD

This invention relates to electric motors and, in particular, to two-phase gate motors.

PRIOR ART

Known in that art is a two-phase gate motor comprising a stator equipped with power coils, rotor position magnetiosensitive pickups disposed in the immediate vicinity of the power windings, and transistors whose bases are connected to outputs of the rotor position magnetosensitive pickups and whose collectors are connected to first leads of the power windings while second leads thereof are electrically connected to a common line (USA, 3 767 986).

In this motor the output signal of the magneto-sensitive element of each rotor position pickup is amplified by a transistor. This is a disadvantage because the transfer ratio of the signal from the magneto-sensitive element of the rotor position pickup to the power winding cannot be made sufficiently stable.

This transfer ratio of a signal from the magneto-sensitive element of the rotor position pickup to the power winding is adequately stable in the known two-phase gate motor (DE, A, 2 601 981) comprising a stator with power windings having different phases, magneto-sensitive rotor position pickups arranged very close to the power windings, a rotor made as a permanent magnet having poles on the active surface facing the power windings and the magneto-sensitive rotor position pickup, and first and second operational amplifiers having inverting and non-inverting inputs connected to outputs of the magneto-sensitive pickups and also having outputs connected to first leads of the power windings whose second leads are electrically connected to a common bus (DE, A, 2 601 981).

However, this prior art gate motor is deficient in that electromagnetic disturbances are produced in each magneto-sensitive rotor position pickup by the power winding of the other phase. This, in turn, results in variations in the motor torque.

DISCLOSURE OF THE INVENTION

This invention is to provide a two-phase gate motor featuring a means interconnecting the power windings with different phases, which could compensate electromagnetic interference produced in the magneto-sensitive rotor position pickup by the power winding of the adjoining phase and in this manner to reduce variations in the motor torque.

This is achieved in that in a two-phase gate motor comprising a stator with power windings having different phases, magneto-sensitive rotor position pickups arranged very close to power windings, a rotor made as a permanent magnet whose poles are disposed on the active surface facing the power windings and magneto-sensitive rotor position pickups, and first and second operational amplifiers having inverting and non-inverting inputs connected to outputs of the magneto-sensitive pickups and also having outputs connected to first leads of the power windings whose second leads are electrically connected to common bus, according to the invention, each first and second operational amplifier is provided with a means for compensation of electromagnetic interferences from the power winding of the adjoining phase, which are produced in the magneto-sensitive rotor position pickup, said means being electrically connected to one of the inputs of the first and second operational amplifiers and to an output of said first and second operational amplifiers.

Desirably, the means for compensation of electromagnetic interferences from the power winding of the adjoining phase, produced in the magneto-sensitive rotor position pickup, provided for each first and second operational amplifiers should comprise a main resistor whose first output is connected to the inverting input of the first operational amplifier and to the non-inverting input of the second operational amplifier, while a second output thereof is electrically connected to the output of the second operational amplifier for the first operational amplifier and to the output of the first operational amplifier for the second operational amplifier.

It is also desirable that the second lead of the main resistor should be directly connected to the output of the second operational amplifier for the first operational amplifier and to the output of the first operational amplifier for the second operational amplifier.

Reasonably, the means for compensation of electromagnetic interference from the power winding of the adjoining phase produced in the magneto-sensitive rotor position pickup, provided for each first and second operational aplifiers, should comprise an additional resistor whose first lead is connected to a second lead of the power winding, while a second lead thereof is connected to a common bus, the second lead of the main resistor being connected to the output of the second operational amplifier for the first operational amplifier and to the output of the first operational amplifier for the second operational amplifier by way of cennecting said second lead to the point where the second lead of the power winding is joined with the first lead of the additional resistor.

The two-phase gate motor made according to the invention permits reduction of variations in the motor torque by lowering the interferences produced by the power winding of the adjoining phase in the magneto-sensitive rotor position pickup.

BRIEF DESCRIPTION OF DRAWINGS

The invention will now be described in greater detail with reference to concrete embodiments thereof and accompanying drawings wherein.

BEST MODE FOR CARRYING OUT THE INVENTION

Figure 1:
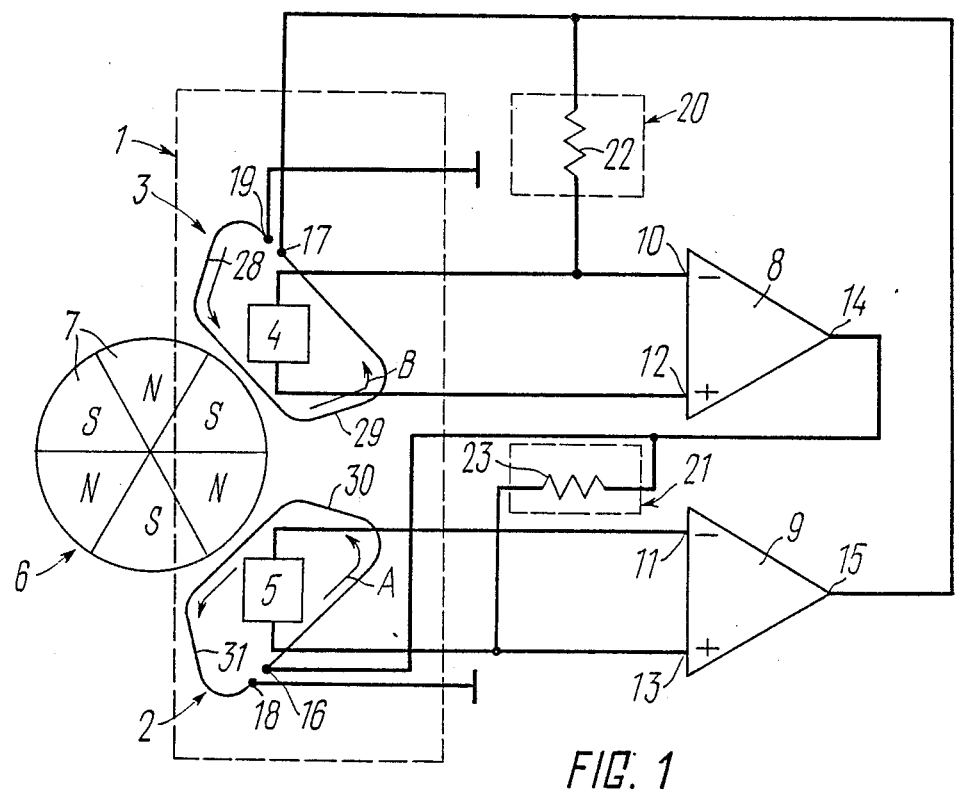
FIG. 1 shows a schematic circuit diagram of a two-phase gate motor, according to the invention.

A two-phase gate motor comprises, according to the invention, a stator 1 (FIG. 1) equipped with power windings 2 and 3 having different phases, magneto-sensitive position pickups 4 and 5 of a rotor 6, which are located very close to the power windings 3 and 2, respectively. The gate motor also comprises a rotor 6 made as a permanent magnet having poles N and S 7 on the active surface facing the power windings 2 and 3 and the magneto-sensitive rotor position pickups 4 and 5, and operational scaler amplifiers 8 and 9 featuring inverting inputs 10 and 11 and non-inverting inputs 12 and 13, respectively.

The inputs 10 and 12 are connected to the outputs of the magneto-sensitive pickup 4. The outputs of the magneto-sensitive pickup 5 are connected to the inputs 11 and 13.

Outputs 14 and 15 of the operational scaler amplifiers 8 and 9 are connected to leads 16 and 17 of the power windings 2 and 3, respectively. Other leads 18 and 19 of the power windings 2 and 3 are connected to a common bus which is shown conventionally in the drawings.

The two-phase gate motor also comprises, according to the invention, for each operational scaler amplifier 8 and 9, a means 20 and 21 for compensation of electromagnetic interferences from the power winding 3 and 2 of the adjoining phase, which are produced in the magneto-sensitive rotor position pickups 4 and 5. These means 20 and 21 are electrically connected to one of the inputs 10 and 13 of the operational scaler amplifier 8 and 9 and to the output 15 and 14 of the operational amplifier 9 and 8, respectively.

In this embodiment of the invention, the means 20 comprises a resistor 22, while the means 21 comprises a resistor 23. One lead of the resistor 22 is connected to the inverting input 10 of the operational scaler amplifier 8, while the other lead is directly connected to the output 15 of the operational scaler amplifier 9. One lead of the resistor 23 is connected to the non-inverting input 13 of the operational scaler amplifier 9, while the other lead thereof is connected directly to the output 14 of the operational scaler amplifier 8.

In another embodiment of the two-phase gate motor, according to the invention, the means 20 (FIG. 2) additionally comprises one more resistor 24 whose one lead is connected to the lead 19 of the power winding 3, while the other lead thereof is connected to a common bus. In this case, the resistor 22 is connected by one lead thereof to the inverting input 10 of the operational amplifier 8, while the other lead thereof is joined to a point 25 where the lead 19 of the power winding 3 is connected to the lead of the resistor 24.

The means 21 additionally comprises one more resistor 26 having one lead connected to the lead 18 of the power winding 2, while the other lead thereof is connected to the common bus. In this case, the resistor 23 is connected by one lead thereof to the non-inverting input 13 of the operational scaler amplifier 9, while the other lead thereof is connected to a point 27 where the lead 18 of the winding 2 is joined with the lead of the resistor 26.

It is desirable that in the two phase gate motor, according to the invention, currents in the power windings 2 (FIGS. 1 and 2) and 3 should be shifted by ±90 electrical degrees in order to achieve a constant angular speed. This shift corresponds to a solid angle of (m360±90)/n geometrical degrees, where m is an arbitrary integer,
n is the number of pole pairs.

The arrangement of the poles 7, N and S, on the rotor 6 and of the power windings 2 and 3 on the stator 1 correspond to m=1 and n=3, respectively. This arrangement is preferable because the magneto-sensitive rotor position pickups 4 and 5 are placed inside the power windings 3 and 2. The elements positioned opposite the active surface of the rotor 6 are displaced to 30° each in relation to the preceding one in the following order (counted clockwise in the plane of the drawing): the first working section 28 of the power winding 3, the magneto-sensitive pickup 4, the second working section 29 of the power winding 3, the first working section 30 of the power winding 2, the magneto-sensitive pickup 5, the second working section 31 of the winding 2.

The two-phase gate motor according to the invention operates as follows.

Suppose that the magneto-sensitive rotor position pickups 4 (FIG. 1) and 5 are arranged so that, when the magnetic force lines are directed into the drawing plane, positive potential is applied at the non-inverting inputs 12 and 13 of the operational scaler amplifiers 8 and 9 and, consequently, at the outputs 14 and 15.

Suppose also that the rotor 6 is located below the plane of the power windings 2 and 3 and the magneto-sensitive rotor position pickups 5 and 4 and has a larger diameter.

At a given instance, the rotor 6 occupies the position shown in FIG. 1. The magneto-sensitive pickup 4 is located in the zone of magnetic force lines directed into the plane of the drawing and, consequently, a positive potential is produced at the output 14. Current in the power winding 2 flows counterclockwise as shown by the arrow A. According to the Fleming's left-hand rule the working sections 30 and 31 of the power winding 2 are subjected to forces directed to the right and upward in the plane of the drawing because the rotor 6 interacts with the magnetic field of the poles 7. Since the power winding 2 is secured on the stator 1, the poles 7 of the rotor 6 start moving in the opposite direction and the rotor starts rotating clockwise.

Similarly, in the other phase, the magneto-sensitive rotor position pickup 5 is located in the zone of the magnetic force lines directed from the drawing plane. This produces a negative potential at the output 15 and, consequently, current in the power winding 3 flows counter-clockwise in the direction indicated by the arrow B. The working sections 28 and 29 of the power winding 3 make the rotor 6 turn in the clockwise direction.

Let us deal now with the electromagnetic interference produced by the power winding 3 in the magneto-sensitive rotor position pickup 4. It follows from the direction of current that the magnetic field of the power winding 3 is directed from the drawing plane. This means that this magnetic field diminishes the magnetic field of the rotor 6 and, consequently, reduces the positive potential at the output 14 of the operational amplifier 8.

The resistor 22 connected to the output 15 of the operational amplifier 9, which at this instance has a negative potential, reduces the potential of the inverting input 10 of the operational amplifier 8 and, consequently, raises the potential at the output 14 of the operational amplifier 8. In this manner the lower potential caused by the electromagnetic interference from the power winding 3 is compensated. This reduction of the potential at the inverting input 10 of the operational amplifier 8 constitutes the compensating signal for the operational amplifier 8 and, similarly, for the operational amplifier 9.

The magnetic field of the power winding 2, on the contrary, adds to the magnetic field of the rotor 6 and to compensate this addition the means 21 applied a positive potential from the output 14 to the non-inverting input 13, thus raising the potential at the output 15, compensating the electromagnetic interference. It becomes clear that the compensation signal should be applied to opposite inputs of the operational amplifiers 8 and 9.

When the motor is reversed, e.g. by changing the sign of the transmission ratio signal from the magneto-sensitive pickups 4 and 5 to the power windings 3 and 2, the polarity of the compensating signal should be reversed in both phases.

Figure 2:
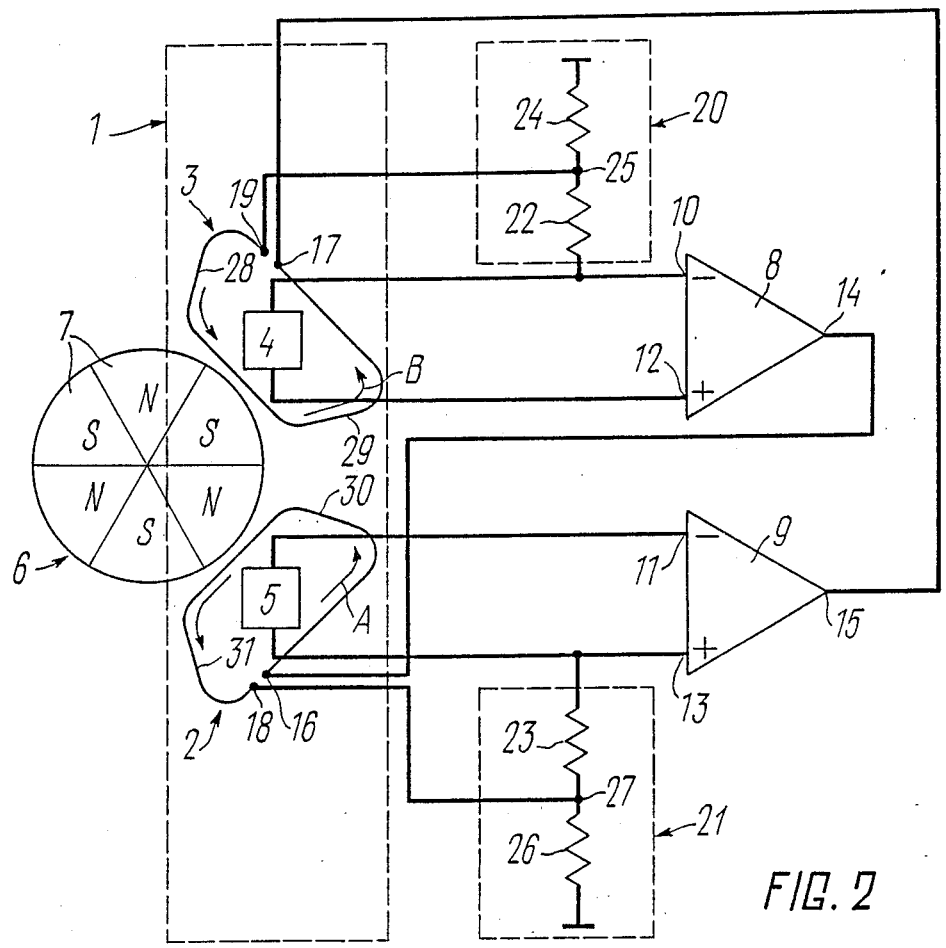
FIG. 2 shows another embodiment of a schematic circuit diagram of a two-phase gate motor, in accordance with the invention.

Operation principle of the two-phase gate motor shown in FIG. 2 is similar to that of the motor of FIG. 1.

There is, however, a difference consisting in that in the motor of FIG. 2 the magnitude of the compensating signal is proportional not to the voltage of the power winding 2, 3 whose electromagnetic interference is to be compensated, as in the former case, but to the current value. Since the magnitude of the electromagnetic interference from the power winding 2, 3 is proportional to the current in this winding, this embodiment of the gate motor is still more advantageous because the accuracy of interference compensation is practically unaffected by the motor rotational speed and the temperature of the power windings 2, 3.

The two-phase gate motor disclosed herein and its embodiments can be useful to reduce variations in the motor torque due to compensation of electromagnetic interferences produced by power windings of adjoining phases in each magneto-sensitive rotor position pickup. The effect of such interferences can actually be cut down by a factor of 5 to 10.

INDUSTRIAL APPLICABILITY

The invention can be used in record players and recorders, tape drives, memory drives, and particularly in compact-disc players where rotational speed is to be maintained extremely accurately.

We claim:

1. A two-phase gate motor comprising a stator (1) equipped with power windings (2,3) having different phases, magneto-sensitive rotor position pickups (4,5) displaced in the immediate vicinity of these power windings (2, 3), a rotor (6) made as a permanent magnet having poles (7) on the active surface facing the power windings (2, 3) and the magneto-sensitive rotor position pickups (4, 5), and first and second operational amplifiers (8, 9) having inverting and non-inverting inputs (10, 11 and 12, 13) connected to outputs of the magneto-sensitive rotor position pickups (4,5) and also having outputs (14, 15) connected to first leads (16, 17) of the power windings (2, 3) whose second leads (18, 19) are electrically connected to a common bus, characterized in that each first operational amplifier (8) and second operational amplifier (9) is provided with a means (20, 21) for compensation of electromagnetic interferences produced by the power winding (3, 2) of the adjoining phase in the magneto-sensitive rotor position pickup (4, 5), said means (20, 21) being electrically connected to one of the inputs (10, 13) of the first and second operational amplifier (8, 9) and to an output (15, 14) of the second and first operational amplifier (9,8).

2. A two-phase gate motor as claimed in claim 1, characterized in that the means (20, 21) for compensation of electromagnetic interferences produced by the power winding (3, 2) of the adjoining phase in the magneto-sensitive rotor position pickup (4, 5) comprises, for each first and second operational amplifier (8,9), a main resistor (22, 23) whose first lead is connected to the inverting input (10) for the first operational amplifier (8) and to the non-inverting input (13) for the second operational amplifier (9), while the second
    lead thereof is electrically coupled to the output (15) of the second operational amplifier (9) for the first operational amplifier (8) and to the output (14) of the first operational amplifier (8) for the second operational amplifier (9).

3. A two-phase gate motor as claimed in claim 2, characterized in that the second lead of the main resistor (22, 23) is directly joined to the output (15) of the second operational amplifier (9) for the first operational amplifier (8) and to the output (14) of the first operational amplifier (8) for the second operational amplifier (9).

4. A two-phase gate motor as claimed in claim 2, characterized in that for each first and second operational amplifier (8,9) the means (20, 21) for compensation of electromagnetic interferences produced by the power winding (3, 2) of the adjoining phase in the magneto-sensitive rotor position pickup (4, 5) comprises an additional resistor (24, 26) whose first lead is connected to the second lead (19, 18) of the power winding (3, 2), while the second lead thereof is joined to the common bus, the second lead of the main resistor (22, 23) being connected to the output (15) of the second operational amplifier (9) for the first operational amplifier (8) and to the output (14) of the first operational amplifier (8) for the second operational amplifier (9) by being joined to a point (25, 27) where the second lead (19, 18) of the power winding (3, 2) is connected to the first lead of the additional resistor (24, 26).

* * * * *